May 15, 1962  W. H. HESSENTHALER ET AL  3,034,941
TEAR BEADED WRAPPING MATERIAL
Filed Nov. 1, 1957
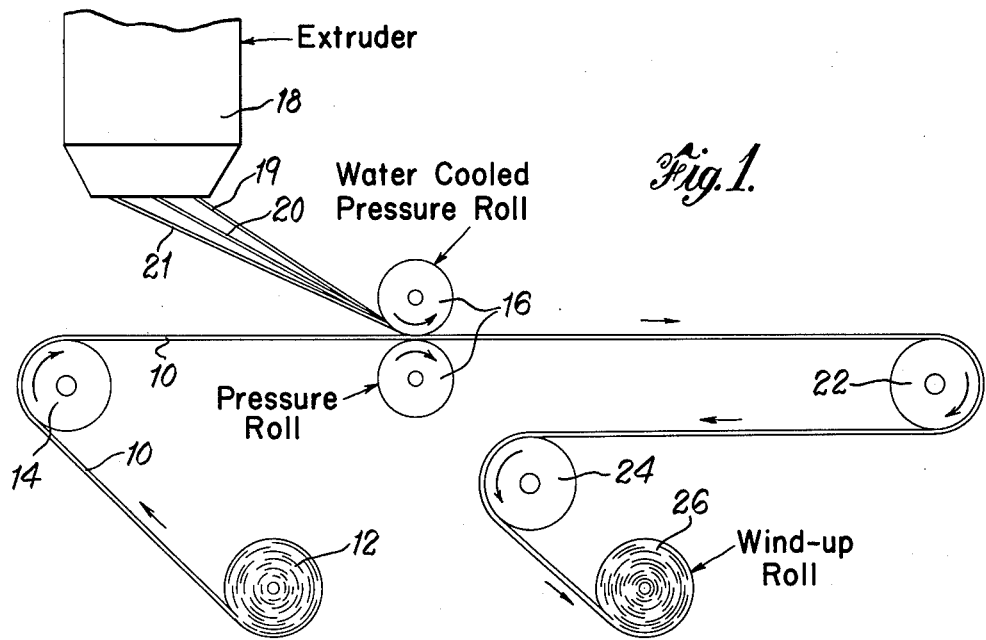
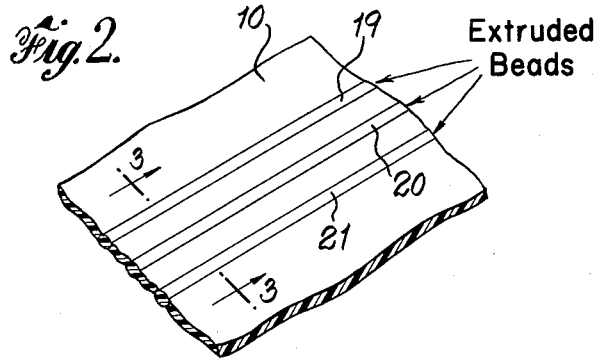
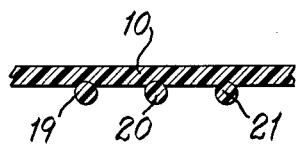
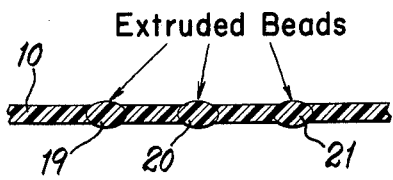
INVENTORS
WALTER H. HESSENTHALER
HAROLD M. SHAPPELL
BY
Richard S. Shreve, Jr.
ATTORNEY

United States Patent Office 3,034,941
Patented May 15, 1962

3,034,941
TEAR BEADED WRAPPING MATERIAL
Walter H. Hessenthaler, Somerville, and Harold M. Shappell, Bound Brook, N.J., assignors to Union Carbide Corporation, a corporation of New York
Filed Nov. 1, 1957, Ser. No. 693,868
10 Claims. (Cl. 154—46)

This invention relates to tear beaded wrapping materials and methods for preparing the same. More particularly, it relates to packaging materials having tear beads which enable packages wrapped even with an elastomeric material such as a thermoplastic film to be opened easily.

Packages wrapped with an elastomeric material such as a polyethylene film are hard to open because such materials cannot be torn easily. This is a major objection to the use of polyethylenic and other elastomeric film for many packaging applications for which they are otherwise eminently suitable.

Packages wrapped with cellophane or other relatively non-extensible materials can be opened satisfactorily by a simple tear string or tear ribbon such as a cellophane tear ribbon or, in the case of heavier materials such as corrugated cardboard, by a tear strip of a stronger material such as polyethylene terephthalate or the like.

However, the use of a cellophane or polyethylene terephthalate ribbon or, for that matter, any unattached, or even surface-adhered but non-imbedded, ribbon is inoperative for the purpose of the present invention because, unlike cellophane, an elastomeric film such as a polyethylene film elongates or stretches to a very considerable degree before it tears. Consequently, the above-cited type ribbon will stretch the film to a great extent, and may or may not tear it; and even if the wrapping does ultimately tear, it is so badly stretched and misshapen as to be just about completely ruined. Additionally, such a tear ribbon is slow and inconvenient in that considerable force must be exerted thereon. Moreover, the gripping force with which the package must be held against the pulling force is often sufficient to damage the package and/or its contents.

It is therefore the main object of the present invention to provide operative tearing means for opening packages wrapped with polyethylene or other elastomeric or extensible materials.

In the drawings:

FIG. 1 is a diagram of apparatus for carrying out the method of and producing the product according to a preferred embodiment of the present invention;

FIG. 2 is a perspective view of a fragment of the wrapping material provided with the tear bead according to the present invention and produced thereby;

FIG. 3 is a transverse section taken along the line 3—3 of FIG. 2; and

FIG. 4 is a similar section of a modification.

Referring to FIG. 1 and using polyethylene film for purposes of illustration, the film 10 is payed out from supply roll 12 over idler roll 14 and positioned to enter the nip of driver pinch rolls 16. The extruder 18, shown in more detail in the copending application of Haine and Chinn, Serial No. 594,929, filed June 29, 1956, provides one or more hot beads 20 of polyethylene which is directed into contact with the surface of the film 10 as it enters the nip.

As disclosed in said copending application, the temperature and speed of extrusion of the bead and the distance from the point of extrusion to the point of contact with the sheet are correlated to the speed of the sheet to cause draw-down of the bead to enable the bead to support itself and maintain the continuity thereof across said distance.

As the bead and film pass through the nip, the hot bead 20 is pressed into intimate contact with the adjacent surface of the polyethylene film 10, transfers sufficient heat thereto to cause it to melt and flux, and the bead and film are fused together. The beaded product issuing from the nip rolls then passes over idler rolls 22 and 24 to a wind-up 26 or other suitable collecting arrangement or directly to the packaging, over-wrapping or other end-use manufacturing line.

The tear filaments of this invention must be attached to the film and at least partially imbedded therein or at least partially impressed thereinto. A filament which has been so adhered to and at least partially impressed into the film introduces one or more lines of weakness along which a tear can be propagated quickly and conveniently.

FIGS. 2 and 3 show the extruded beads just about totally imbedded in the film. FIG. 4 shows the filaments only partially imbedded in the film.

It was found that by extruding a thin monofilament of polyethylene onto polyethylene film that the film would easily tear along the length of the filament. For films about 5–10 mils thick, a single monofilament is all that is required. For thinner films it is desirable to extrude three monofilaments 19, 20, 21, onto the film and utilize the center monofilament 20 as the tear strip, while the outside monofilaments 19 and 21 resist stretching therebetween and tearing therebeyond, and also hold the polyethylene film close to the package. A film closely wrapped and firmly attached to the package is torn much easier than a package wrapped very loosely.

One or preferably three monofilaments of polyethylene are extruded onto a film by the method described in the aforesaid Haine and Chinn application, using a one or a three hole die. The film is then easily torn between the two outside filaments by employing the center filament as a tear strip, the outside filaments holding the film securely to the package while the film is being torn. Tearing is facilitated by cutting the film a short distance (½ to 1 inch) on each side of the center filament. The filament may be colored to add to the attractiveness of the package.

As indicated, a single filament is generally sufficient for relatively thick, say about 5–10 mils, films; but with one minor exception cited below, three filaments are essential for thin films, i.e., about 3 mils or thinner. The outer filaments reinforce the film and prevent stretching when the center filament is pulled and confine the tear, which propagates quickly and cleanly along the inner edges of the outer filaments.

The triple filament embodiment is particularly desirable for overwrapped and other packages for which thin films are generally used.

A thin film containing a single tear filament does not generally tear satisfactorily. When the filament is pulled, it causes an unwelcome amount of film stretching; and the tears, which usually initiate on both sides of the filament, diverge and run off irregularly and more or less uncontrollably and a large, wedge-like section of film is torn out.

However, a single tear filament will work satisfactorily on a thin film if it is impressed sufficiently into the film, that is, deeply enough to perceptibly thin the film thereunder. A so impressed filament weakens that portion of the film under and/or immediately adjacent said filament to such an extent that the tear propagates cleanly and satisfactorily when the filament is pulled. The utility of a so weakened film is limited however to those applications requiring only relatively low film strength.

Any strong filament, such as cotton, silk, wire, nylon, glass fiber or the like can be used. The filament may be formed and joined to the film by an integrated process such as hereinbefore described; or a preformed filament may be imbedded into the film in a separate operation or in line with the film forming or the packaging or over-wrapping operations as, for example, by passing the filment and film, at an appropriate temperature, between a pair of pressure rolls. For instance, the desired number of filaments may be mated with an extruded film by delivering said filaments and the hot film directly from the extruder to such a pair of pressure rolls; or, alternatively, preformed film may be used and heated to the appropriate temperature; or, in some instances, as for example when the filament is of wire or glass or such nature, the filament may be pre-heated; or both filament and film may be heated. The extruded bead method is preferred because of its versatility and the ease with which it can be placed in line with the end-use such as a packaging or wrapping operation.

What is claimed is:

1. Method of forming a beaded wrapping material, which comprises heating a supply of thermoplastic material, extruding a hot bead of said material, directing said hot extruded bead into contact with only a narrow band on only the adjacent surface of only a single sheet of wrapping material, maintaining the temperature and speed of extrusion of said bead and the distance from the point of extrusion to the point of contact with said sheet to enable said bead to support itself and maintain continuity thereof across said distance, then causing said bead and sheet to be pressed firmly and intimately together while said self-supporting extruded bead is hot to cause them to adhere together and to imbed said bead at least partially into said sheet sufficiently deeply to thin the wrapping material thereunder and form a line of weakness, while leaving an adjacent band on the bare surface of said sheet on each side of said bead free of any extruded material.

2. Method of forming a tear beaded wrapping material, which comprises heating a supply of thermoplastic material, extruding a monofilament of said hot thermoplastic material, continuously directing said hot extruded monofilament into contact with only a narrow band on only the adjacent surface of only a single sheet of wrapping material, maintaining the temperature and speed of extrusion of said monofilament the distance from the point of extrusion to the point of contact with said sheet correlated to the speed of said sheet to enable said monofilament to support itself and maintain the continuity thereof across said distance then causing said hot extruded self-supporting monofilament and said sheet of wrapping material to be pressed firmly and intimately together while said extruded monofilament is still hot to cause them to adhere together and to embed said extruded monofilament at least partially into said sheet sufficiently deeply to weaken the sheet adjacent the filament to form a tear line while leaving an adjacent band on the bare surface of said sheet on each side of said monofilament free of any extruded material, and cooling said hot embedded, extruded monofilament sufficiently to harden and strengthen the same to enable pulling of the hardened extruded monofilament to tear completely through the weakened sheet of wrapping material along said tear line.

3. Method as claimed in claim 1, in which said hot extruded bead is of a polyethylene composition.

4. Method as claimed in claim 1, in which the wrapping material is a polyethylenic film.

5. Tear beaded wrapping material which comprises a sheet of wrapping material and at least one extruded, drawn down, self-supporting thermoplastic monofilament bonded to only a narrow band on only the adjacent surface of said sheet and at least partially embedded therein sufficiently deeply to weaken the same adjacent said monofilament to form a tear line, an adjacent band on the bare surface of said sheet on each side of said monofilament being free of any extruded material, the strength of the bead and the strength of the bond being sufficient to cause pulling of the monofilament to tear completely through said wrapping material along said tear line.

6. Wrapping material as claimed in claim 5, in which said sheet is constructed of polyethylenic film.

7. Wrapping material as claimed in claim 5, in which said bead is extruded polyethylene composition.

8. Method of forming a wrapping material with a tear opening bead, which comprises heating a supply of thermoplastic material, extruding a hot filament of said material, directing said hot extruded filament into contact with only a narrow band on only the adjacent surface of only a single sheet of wrapping material while at least one of said filament and sheet members is hot, maintaining the temperature and speed of extrusion of said filament and the distance from the point of extrusion to the point of contact with said sheet and the speed of said sheet in excess of the speed of extrusion all sufficient to cause drawdown of said filament as it traverses said distance and causing said filament and sheet to be pressed firmly and intimately together to adhere them to each other and to embed said drawn down filament at least partially into said wrapping material sufficiently deeply to weaken the material of said sheet to form a tear line, while leaving an adjacent wider band on the bare surface of said sheet on each side of said filament free of any extruded material.

9. Wrapping material having an opening tear bead, which comprises a sheet of wrapping material in combination with extruded, self-supporting, drawn down beads of thermoplastic material comprising a central tear facilitating bead and an auxiliary stretch restricting bead on each side thereof and substantially parallel and closely adjacent thereto but laterally spaced therefrom, with bands of bare wrapping material surface therebetween, said beads being bonded to said wrapping material and at least partially embedded therein, said central bead being embedded sufficiently deeply to weaken the wrapping material adjacent thereto, the strength of said central bead and the weakening of said wrapping material adjacent thereto being sufficient to cause tearing completely through said wrapping material by pulling of said central bead, and the strength of said auxiliary beads and the strength of their bonds to said wrapping material being sufficient to reinforce said wrapping material and prevent stretching thereof and tearing beyond said auxiliary beads.

10. Method of forming a wrapping material with a tear opening bead, which comprises heating a supply of thermoplastic material, extruding hot beads of said heated material, directly three separate hot beads of said extruded thermoplastic material into contact with respective spaced apart narrow bands on a sheet of wrapping material, maintaining the temperature and speed of extrusion of said beads and the distance from the point of extrusion to the point of contact with said sheet and the speed of said sheet in excess of the speed of extrusion all sufficient to cause drawdown of said beads as they traverse said distance and then causing said drawn down beads and said sheet to be pressed firmly and intimately together to adhere them together at said spaced bands and at least partially embed said drawn down beads into said sheet the middle bead being embedded sufficiently deeply to weaken the wrapping material adjacent thereto to form a tear line, while leaving the surface of the sheet between said middle bead and the bead on each side thereof free of any of said hot thermoplastic material, said side beads being embedded sufficiently deeply to reinforce said wrapping material and prevent stretching thereof and tearing beyond said side beads.

References Cited in the file of this patent

UNITED STATES PATENTS

| | | |
|---|---|---|
| 2,539,690 | Boorn | Jan. 30, 1951 |
| 2,593,090 | Bartosz | Apr. 15, 1952 |
| 2,611,483 | Adams | Sept. 23, 1952 |
| 2,640,796 | Langer | June 2, 1953 |
| 2,715,088 | Gunning | Aug. 9, 1955 |
| 2,744,041 | Balchen | May 1, 1956 |